United States Patent
Li et al.

(10) Patent No.: US 11,595,319 B2
(45) Date of Patent: Feb. 28, 2023

(54) DIFFERENTIAL OVERBOOKING IN A CLOUD COMPUTING ENVIRONMENT

(71) Applicant: Microsoft Technology Licensing, LLC, Redmond, WA (US)

(72) Inventors: Changsong Li, Redmond, WA (US); Ajay Kalhan, Redmond, WA (US); Pankaj Arora, Sammamish, WA (US); Junfeng Dong, Sammamish, WA (US); Yi Shan, Redmond, WA (US); Christian Konig, Kirkland, WA (US); Manoj Syamala, Issaquah, WA (US); Vivek Narasayya, Redmond, WA (US); Shize Xu, Redmond, WA (US); John M. Oslake, Seattle, WA (US); Jiaqi Liu, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 119 days.

(21) Appl. No.: 17/129,548

(22) Filed: Dec. 21, 2020

(65) Prior Publication Data

US 2022/0200927 A1 Jun. 23, 2022

(51) Int. Cl.
*G06F 15/16* (2006.01)
*H04L 47/762* (2022.01)
(Continued)

(52) U.S. Cl.
CPC .......... *H04L 47/762* (2013.01); *H04L 47/745* (2013.01); *H04L 47/783* (2013.01)

(58) Field of Classification Search
CPC .......................... H04L 47/762; H04L 47/745
See application file for complete search history.

(56) References Cited

U.S. PATENT DOCUMENTS

| 7,702,873 B2* | 4/2010 | Griess | G06F 3/067 |
| | | | 711/170 |
| 8,104,039 B2* | 1/2012 | Huizenga | G06F 9/5061 |
| | | | 718/104 |

(Continued)

FOREIGN PATENT DOCUMENTS

WO 2016188706 A1 12/2016

OTHER PUBLICATIONS

Lang, et al., "Not for the Timid: On the Impact of Aggressive Over-Booking in the Cloud", In Proceedings of the VLDB Endowment, vol. 9, Issue 13, Sep. 1, 2016, pp. 1245-1256.

(Continued)

*Primary Examiner* — Hieu T Hoang
(74) *Attorney, Agent, or Firm* — ArentFox Schiff LLP (57) ABSTRACT

Techniques for differential overbooking on a cloud database. These techniques may include determining a reservation amount of a multi-tenant resource for a first service of a based upon an overbooking characteristic of the first service, and determining that a total usage value of the multi-tenant resource by a plurality of services is greater than a threshold value. In addition, the techniques may include determining a service usage value of the multi-tenant resource by the first service, determining a first overage value of the first service based on the service usage value and the reservation amount, and performing a resource reclamation process over the multi-tenant resource based on the first overage value of the first service.

20 Claims, 4 Drawing Sheets

(51) Int. Cl.
    *H04L 47/74*            (2022.01)
    *H04L 47/783*        (2022.01)

(56) References Cited

U.S. PATENT DOCUMENTS

| | | | | |
|---|---|---|---|---|
| 8,612,330 | B1* | 12/2013 | Certain | G06F 9/50 705/37 |
| 8,635,422 | B1* | 1/2014 | Kaliannan | G06F 3/0665 711/170 |
| 8,667,207 | B2* | 3/2014 | Knowles | G06F 9/5077 711/170 |
| 9,582,220 | B2* | 2/2017 | Samuels | G06F 3/0619 |
| 9,940,228 | B2* | 4/2018 | Corrie | G06F 12/023 |
| 10,037,221 | B2* | 7/2018 | Thomas | G06F 9/45558 |
| 10,355,870 | B2* | 7/2019 | Cropper | H04L 12/1428 |
| 2002/0087822 | A1* | 7/2002 | Butterworth | G06F 3/0689 711/170 |
| 2003/0202467 | A1* | 10/2003 | Bruckman | H04L 47/10 370/252 |
| 2007/0118712 | A1* | 5/2007 | van Riel | G06F 12/023 711/170 |
| 2007/0300230 | A1* | 12/2007 | Barsness | G06F 9/4881 718/103 |
| 2008/0216082 | A1* | 9/2008 | Eilam | G06F 9/5072 718/104 |
| 2009/0172336 | A1* | 7/2009 | Schmidt | G06F 9/5016 711/170 |
| 2009/0307432 | A1* | 12/2009 | Fleming | G06F 12/0284 711/170 |
| 2011/0191563 | A1* | 8/2011 | Acedo | G06F 3/0605 711/170 |
| 2012/0278566 | A1* | 11/2012 | Gilson | G06F 3/0644 711/E12.001 |
| 2013/0191541 | A1* | 7/2013 | Kishan | G06F 9/5011 709/226 |
| 2013/0301652 | A1* | 11/2013 | Oz | H04L 69/22 370/468 |
| 2014/0006621 | A1* | 1/2014 | Sims | G06F 9/50 709/226 |
| 2014/0207740 | A1* | 7/2014 | Narasayya | G06F 11/3442 707/688 |
| 2015/0195173 | A1* | 7/2015 | Gupta | H04L 43/16 709/224 |
| 2015/0293881 | A1* | 10/2015 | Raikin | G06F 12/1072 709/212 |
| 2016/0054991 | A1* | 2/2016 | Agostinacchio | G06F 8/61 717/170 |
| 2016/0125463 | A1* | 5/2016 | Ilghar | G06Q 30/06 705/14.55 |
| 2016/0246652 | A1* | 8/2016 | Herdrich | G06F 9/5077 |
| 2016/0371021 | A1* | 12/2016 | Goldberg | G06F 3/0605 |
| 2017/0295223 | A1* | 10/2017 | Prasad | H04L 67/1012 |
| 2018/0007128 | A1* | 1/2018 | Ramachandra | H04L 41/5009 |
| 2018/0150232 | A1* | 5/2018 | Tsirkin | G06F 9/45558 |
| 2019/0034095 | A1* | 1/2019 | Singh | G06F 3/0685 |
| 2019/0155655 | A1* | 5/2019 | Sha | G06F 9/52 |
| 2019/0317826 | A1* | 10/2019 | Jain | G06F 9/5077 |
| 2019/0340273 | A1* | 11/2019 | Raman | G06F 16/2315 |
| 2020/0133551 | A1* | 4/2020 | Jiang | G06F 3/0631 |
| 2020/0349067 | A1* | 11/2020 | Syamala | G06F 12/0253 |
| 2021/0051113 | A1* | 2/2021 | Liu | H04L 47/76 |
| 2021/0144517 | A1* | 5/2021 | Guim Bernat | H04L 47/781 |
| 2021/0182108 | A1* | 6/2021 | Eberlein | G06F 9/4881 |
| 2021/0216505 | A1* | 7/2021 | Zhao | G06N 5/04 |
| 2021/0373956 | A1* | 12/2021 | Krasner | G06F 11/3006 |

OTHER PUBLICATIONS

"International Search Report and Written Opinion Issued in PCT Application No. PCT/US21/062498", dated May 12, 2022, 11 Pages.

* cited by examiner

DIFFERENTIAL OVERBOOKING IN A CLOUD COMPUTING ENVIRONMENT

BACKGROUND

A cloud computing environment may provide one or more resources as a service to customers over a network. As an example, a database as a service (DaaS) may provide database functionalities via a cloud computing environment to allow customers to make relational queries over stored data. In some instances, a cloud computing environment may employ a shared set of resources to provide multiple services to the customers. But the cloud computing environment may encounter resource management conflicts when the services have different service level objectives (SLOs) and/or workload patterns. Further, separating the services may frustrate capacity planning, introduce scalability issues, and cause inefficient utilization of cloud resources.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, a method may include determining, for a first service of a plurality of services, a reservation amount of a multi-tenant resource shared amongst the plurality of services based upon an overbooking characteristic of the first service; determining that a total usage value of the multi-tenant resource by the plurality of services is greater than a threshold value; determining a service usage value of the multi-tenant resource by the first service; determining a first overage value of the first service based on the service usage value and the reservation amount; and performing, in response to the total usage value being greater than the threshold value, a resource reclamation process over the multi-tenant resource based on the first overage value of the first service.

In another aspect, a device may include a memory; and at least one processor coupled to the memory and configured to: determine, for a first service of a plurality of services, a reservation amount of a multi-tenant resource shared amongst the plurality of services based upon an overbooking characteristic of the first service; determine that a total usage value of the multi-tenant resource by the plurality of services is greater than a threshold value; determine a service usage value of the multi-tenant resource by the first service; determine a first overage value of the first service based on the service usage value and the reservation amount; and perform, in response to the total usage value being greater than the threshold value, a resource reclamation process over the multi-tenant resource based on the first overage value of the first service.

In another aspect, an example computer-readable medium storing instructions for performing the methods described herein and an example apparatus including means of performing operations of the methods described herein are also disclosed.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

This disclosure describes techniques for performing differential overbooking in a cloud computing environment. Aspects of the present disclosure provide overbooking of resources for a plurality of services operating on a shared system using different overbooking ratios for each service, while enforcing performance and/or resource guarantees made to each service during periods of resource contention via resource reclamation.

In accordance with some aspects of the present disclosure, a cloud computing system may host a plurality of services on a shared set of resources (e.g., a cloud computing node, physical machine, virtual machine, cluster, etc.). Some examples of services that may be hosted by the cloud computing system include software as a service (SaaS), platform as a service (PaaS), and infrastructure as a service (IaaS). In addition, the services may be associated with different service level agreements, different performance guarantees, different availability guarantees, different workload patterns, different cloud environment execution modes, and/or different cost models.

As described herein, the cloud computing system may overbook the shared resources to maximize platform yield (i.e., the revenue generated by the resources of the platform). As used herein, in some aspects, "overbooking" may refer to reserving less resources for a service than requested by the service. Further, in some examples, a cloud computing system may apply differential overbooking values to services operating on a shared set of resources when reserving cloud individual resources for each service. In some instances, the difference in overbooking values may be based on the differing service level agreements, performance guarantees, availability guarantees, workload patterns, cloud environment execution modes, and/or cost models of the services. Further, the cloud computing system may employ a reclamation process to manage efficient usage of the cloud resources in response to resource contention contexts that arise from one or more services utilizing more resources than reserved for the one or more resources. For example, the cloud computing system may identify utilization pressure with respect to a resource of the cloud computing system, and identify a service that is consuming the resource in excess of the amount of the resource reserved for service. Further, the cloud computing system may reclaim portions of the resource from the identified service in order to alleviate resource contention.

Employing service-specific overbooking value enables a utilization pressure management process of the cloud computing system to manage each service in accordance with the corresponding service level agreement (SLA) of the service instead of treating all services uniformly regardless of the SLAs of the services. Accordingly, the systems, devices, and methods described herein provide techniques for efficient resource utilization, fair access to resources, and increased ease of scalability and extensibility, in cloud computing environments where different services operate over a shared set of resources.

Illustrative Environment

Figure 1:
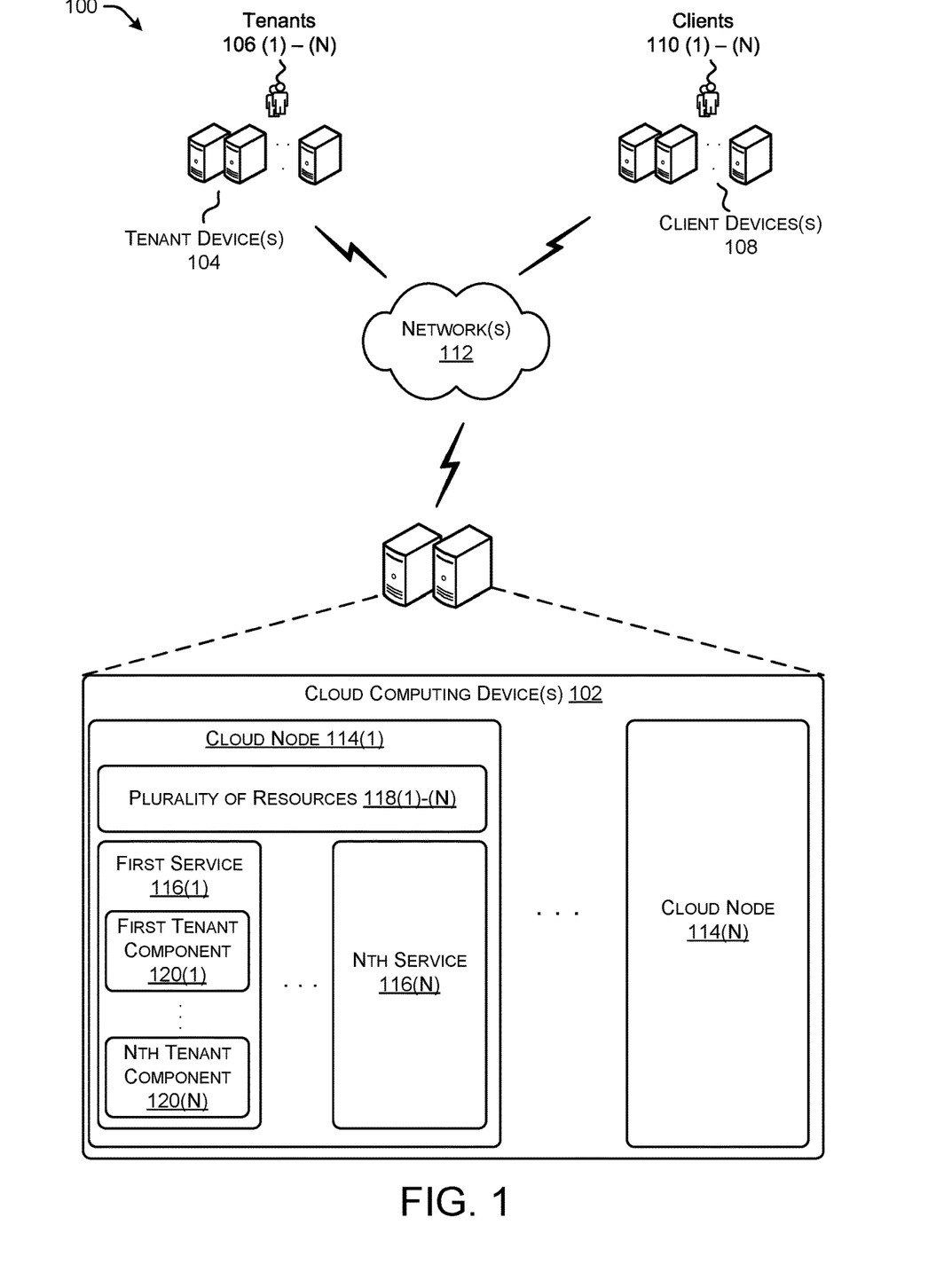
FIG. 1 is a schematic diagram showing an example environment for performing differential overbooking in a cloud computing environment, in accordance with some aspects of the present disclosure.

FIG. 1 is a schematic diagram showing an example environment 100 for performing differential overbooking in a cloud computing environment, in accordance with some aspects of the present disclosure. The example environment 100 can include a cloud computing device(s) 102 (e.g., Microsoft Azure®, GOOGLE® Cloud Platform, Amazon AWS®, Oracle Cloud®, etc.), a plurality of tenant devices 104(1)-(N) associated with a plurality of tenants 106(1)-(N), a plurality of client devices 108(1)-(N) associated with a plurality of clients 110(1)-(N), and one or more networks 112(1)-(N).

The network(s) 112 may comprise any one or combination of multiple different types of networks, such as cellular networks, wireless networks, local area networks (LANs), wide area networks (WANs), personal area networks (PANs), the Internet, or any other type of network configured to communicate information between computing devices (e.g., the cloud computing system, the tenant devices 104(1)-(N), and the client devices 108(1)-(N)). Further, the tenant devices 104(1)-(N) and the client devices 108(1)-(N) may comprise any type of end-user computing device storing one or more modules configured to request and receive data from the cloud computing device 102.

In some examples, the cloud computing device 102 may implement a multi-tenant architecture wherein system resources of the cloud computing device 102 are shared among the tenants 106(1)-(N) but individual data associated with each tenant 106 is logically separated. As described herein, the tenants 106(1)-(N) may be customers of the cloud computing device 102. Further, the tenants 106(1)-(N) may have relationships with the plurality of clients 110(1), and provide one or more digital services to the client devices 108(1)-(N) via the cloud computing device 102. As an example, the tenant 106(1) may be a website operator, and the client 110(1) may be a subscriber of the website of the tenant 106(1). In addition, the tenant 106(1) may employ the cloud computing device 102 to provide components of the website to the client device 108(1). For example, the tenant 106(1) may configure the cloud computing device 102 to transmit the content of the website to the client device 108(1).

As illustrated in FIG. 1, the cloud computing device 102 may include a plurality of cloud nodes 114(1)-(N). An individual cloud node 114 may be a physical machine, a virtual machine, a cluster of physical machines, or a cluster of virtual machines. Further, the cloud computing device 102 may employ the cloud nodes 116(1)-(N) to provide cloud services to the tenants 106(1)-(N).

For instance, the first cloud node 114(1) may provide the plurality of services 116(1)-(N) to the tenants 106(1)-(N). Some examples of the services 116(1)-(N) include IaaS, PaaS, SaaS, database as a service (DaaS), security as a service (SECaaS, big data as a service (BDaaS), a monitoring as a service (MaaS), logging as a service (LaaS), internet of things as a service (IOTaaS), identity as a service (IDaaS), analytics as a service (AaaS), function as a service (FaaS), and/or coding as a service (CaaS). Further, each service 116 may be associated with an individual SLA defining a level of service provided by the particular service 116 to the tenants 106. In some examples, the level of service may include a performance guarantee and/or availability guarantee. In some aspects, the ability to implement the services 116 having different SLAs on a shared cloud node simplifies capacity planning and provides ease of scalability.

In addition, the level of service may further include an execution model employed to allocate system resources of the cloud computing device 102 to tenants 106 of the corresponding service 116. For instance, an individual service 116 may employ a provisioned mode wherein a tenant 106 pre-purchases system resources to use the service 116. In some other instances, an individual service 116 may employ a serverless mode wherein the cloud computing device 102 automatically provisions, scales, and manages the system resources consumed by a tenant 106 using the service 116.

As illustrated in FIG. 1, the cloud node 114 may include a plurality of resources 118(1)-(N) employed to provide the services 116(1)-(N). Some examples of the resources 118(1)-(N) may include computing units, bandwidth, data storage, memory, field programmable gate arrays (FPGAs), graphics processing units (GPUs), input-output (I/O) throughput, or data/instruction cache. As described in detail herein, the resources of the cloud node 114(1)-(N) may be reserved for use by the services 116(1)-(N) of the cloud node 114(1).

For example, the cloud computing device 102 may be configured to reserve portions of the resources 118(1)-(N) for use by each individual service 116. Further, in some instances, the cloud computing device 102 may overbook the resources 118 by reserving less of the resource 118 than requested by the services 116. In some aspects, overbooking may provide efficient and cost-effective use of the resources 118 given that an individual service 116 may not always require the full amount of system resources requested by the service 116.

As an example, a first service 116(1) may be a DaaS that provides databases to the tenants 106 according to a first SLA defining high performance and high availability, a second service 116(2) may be a DaaS that provides databases to the tenants 106 according to a second SLA defining high performance and moderate availability, and a third service 116(3) may be a LaaS that provides logging functionality to the tenants 106 according to a third SLA defining high performance and high availability. Further, in order to lower the cost of goods sold for the services 116(1)-(N), the cloud computing device 102 may be configured to reserve less of the resources 118(1)-(N) than requested by the services 116(1)-(3). For instance, the cloud computing device 102 may allocate ten terabytes (TBs) of data storage to the services 116(1)-(3) even though the services 116(1)-(3) requested fourteen TBs. Additionally, in some aspects, the cloud computing device 102 may limit overbooking on a cloud node 114 in view of the total capacity of the cloud node 114. In particular, the cloud computing device 102 may limit the amount of a resource 118 reserved by the services 116 of a cloud node 114 to less than or equal to the total or maximum amount of the resource 118 for the cloud node 114. As an example, the cloud computing device 102 may limit the amount of a resource 118 reserved by the services 116 of a cloud node 114 to less than or equal to the total or maximum computing usage for the cloud node 114.

In addition, each service 116 may include tenant components 120(1)-(N) representing local consumption of the service 116. For instance, if the first service 116(1) is a DaaS, the first tenant component 120(1) may represent a database of the first tenant 106(1) provided by the first service 116(1) and/or the portion of the resources 118(1)-(N) used to provide the database of the first tenant 106(1) by the first service 116(1). As another example, if the first service 116(1) is a PaaS, the first tenant component 120(1) may represent a web platform instance of the first tenant 106(1) provided by the first service 116(1) and/or the portion of the resources 118(1)-(N) used to provide the web platform instance of the first tenant 106(1) by the first service 116(1).

In some examples, an individual service 116 may be associated with an overbooking value representing a value that may be used to overbook the resources 118(1)-(N) when the resources 118(1)-(N) are reserved for a service 116. In some aspects, a service 116 may have different overbooking values for individual resources 118 of the resources 118(1)-(N). Additionally, or alternatively, a service 116 may have a shared overbooking value for two or more resources based at least in part on an association established within the SLA of the service 116. Further, a requested or required amount of a resource 118 (e.g., a service level objective) may be divided by the overbooking value to determine the actual amount of the resource 118 that will be reserved for the service 116. For example, the first service 116(1) may have an SLO of six computing units and have an overbooking value of one and a half for computing units. As such, the cloud node 114 may only reserve four computing units for the first service 116(1). In some aspects, the cloud node 114 may be configured to reserve fractional units of a resource 118 for a service 116. As another example, the first service 116(1) may have an SLO of six gigabytes (GBs) and have an overbooking value of one and a half for memory usage. As such, the cloud node 114 may only reserve four GBs for the first service 116(1).

In some aspects, the overbooking ratio applied to a first resource may be based on a service-wide overbooking ratio or an overbooking ratio of a second resource. For instance, the overbooking ratio applied to the first resource may be limited by the overbooking ratio of the second resource in response to the first resource and the second resource being bound together. In some examples, a first resource 118(1) (e.g., a CPU resource) and a second resource 118(2) (e.g., a memory resource) may be bound together, and the following formula may be applied to determine the overbooking ratio of the second resource 118(2) from the overbooking ratio of first resource 118(1):

$$OB\_Res2\_Ratio_{service\ i} = \frac{\text{total } Res1 \text{ capacity}/\text{total } Res2 \text{ capacity}}{\text{Service } Res1 \text{ request}/\text{Service } Res2 \text{ request}} \quad \text{(Equation 1)}$$

-continued
$$OB\_Res1\_Ratio_{service\ i}$$

Where $OB\_Res1\_Ratio_{service\ i}$ is the overbooking ratio of the first resource 118(1) for a service 116, $OB\_Res2\_Ratio_{service\ i}$ is the overbooking ratio of the second resource 118(2) for the service 116, total Res1 capacity is the total capacity of the first resource 118(1) within a cloud node 116, total Res2 capacity is the total capacity of the second resource 118(2) within the cloud node 116, Service Res1 request is the requested amount of the first resource 118(1) by the service 116, and Service Res2 request is the requested amount of the second resource 118(2) by the service 116.

In some examples, an overbooking value of a service 116 may be based on one or more overbooking characteristics of the service 116. Some examples of the overbooking characteristics may include performance requirements of the corresponding SLA, availability requirements of the corresponding SLA, historic usage patterns (e.g., workload patterns), prediction information (e.g., a machine learning prediction of future resource utilization), and/or pricing information. Further, in some aspects, the overbooking value of a service 116 may be determined to reduce failure to provide performance or availability of a resource 118 in view of an acceptable degree set by the SLA of the service 116.

As an example, the first SLA may correspond to a high level of performance and a high level of availability. Accordingly, the first service 116(1) may have a lower overbooking value (e.g., 1.2) that reflects a less aggressive overbooking policy with respect to the service 116(1). As another example, the cloud computing device 102 may determine that the workload pattern of the service 116(1) is consistently resource intensive (e.g., the service 116(1) consumes a resource above a usage threshold for a period of time above a temporal threshold). Accordingly, the first service 116(1) may have a lower overbooking value (e.g., 1.2) that reflects a less aggressive overbooking policy with respect to the service 116(1). As yet still another example, the second SLA may correspond to a moderate level of performance and a moderate level of availability. Accordingly, the second service 116(2) may have a higher overbooking value (e.g., 2) that reflects a more aggressive overbooking policy with respect to the service 116(2) in view of the second SLA. As another example, the first service may 116(1) be implemented in accordance with a provisioned mode and the second service 116(2) may be implemented in accordance with a serverless mode. Further, the cloud computing device 102 may determine that workload patterns for provisioned services typically reflect greater usage of a resource 118 when compared to usage of the resource 118 for the serverless services. Accordingly, the first service 116(1) may have a less aggressive overbooking policy in comparison to the second service 116(2) based upon the respective cloud computing execution mode.

In some instances, a cloud node 114 may determine that utilization of a resource 118 by the services 116(1)-(N) is greater than a predefined threshold. In some instances, the predefined threshold may correspond to the ability of the cloud node 114 to meet one more guarantees associated with the SLAs of the services 116(1)-(N). For example, the cloud node 114 may determine that the amount of memory used by the services 116(1)-(N) is greater than fourteen TBs, and predict that the cloud node 114 may be unable to perform future operations for the services 116(1)-(N) in the near future based on an expected workload using the remaining the two TBs of memory. In response, the cloud node 114 may determine a usage value of memory for each service 116(1)-(N), and determine an overage value of each service 116 based on the usage value of the service 116 and the memory reserved for the service 116.

In some aspects, the cloud node 114 may reclaim memory from a service 116 based on the overage value of the service 116. For instance, the cloud node 114 may reclaim memory from a service 116 based on the service 116 having the highest overage value among the determined overage values of the services 116(1)-(N). In another instance, the cloud node 114 may reclaim memory from one or more services 116 based on the one or more services 116 having an overage value greater than a threshold amount. Further, the cloud node 114 may reclaim memory from the one or more services 116 in proportion to their overage values. In some instances, the cloud node 114 may reclaim memory from a service 116 based on the cloud node 114 determining that reclaiming memory from the service 116 may best alleviate the utilization pressure created by the services 116(1)-(N) without failing to provide the performance guarantees associated with the service level agreement of each of the services. In some instances, the cloud node 114 may reclaim memory from a service 116 based on the SLA and/or cloud computing execution mode of the service 116. For example, the cloud node 114 may reclaim a resource unit of a resource 118 from a fourth service 116(4) associated with a SLA defining a serverless cloud computing execution mode.

As used herein, reclaiming a resource unit of a resource 118 may include disassociating a service 116 and a resource unit of a resource 118 so that the resource unit may be used by another service 116 or the cloud node 114. In some aspects, the cloud node 114 may reclaim a resource unit of a resource 118 based upon usage history and/or access history. For example, if the resource 118 is memory, the cloud node 114 may identify memory units assigned to the service 116 that has not been accessed within a threshold amount of time (i.e., cold memory units), and reclaim the identified memory units from the service 116. As another example, if the resource 118 is data storage, the cloud node 114 may identify data storage units that has been deleted and not accessed within a threshold amount of time but still assigned to the service 116, and reclaim the identified data storage units from the service 116. In some aspects, reclaiming the resources 118(1)-(N) from the different services 116(1)-(N) as described in detail herein provides improved cost of goods sold for the services 116(1)-(N) by maximizing the efficiency of use with respect to the resources 118. In addition, the reclamation process ensures fair access to the cloud resources by preventing any of services 116(1)-(N) from monopolizing the available resource capacity of the cloud unit 114(1), and ensuring each service 116 is provided a performance level in accordance with its respective SLA.

In some aspects, the cloud node 114 may determine that reclaiming available resources (i.e., cold memory) may not sufficiently alleviate the resource utilization pressure generated by the services 116. In response, the cloud node 114 may request that the cloud computing device 102 perform a load balancing process that assigns one of the services 116 to another cloud node 114. Further, the cloud computing device 102 may identify a service 116 having an SLA with an availability guarantee that permits the availability loss that would result from reassignment to another cloud node 114, and identify a cloud node 114 capable of meeting the performance and availability guarantees of the SLA of the identified service 116. In addition, the cloud computing device 102 may transfer the identified service 116 to the identified cloud node 114.

Figure 2:
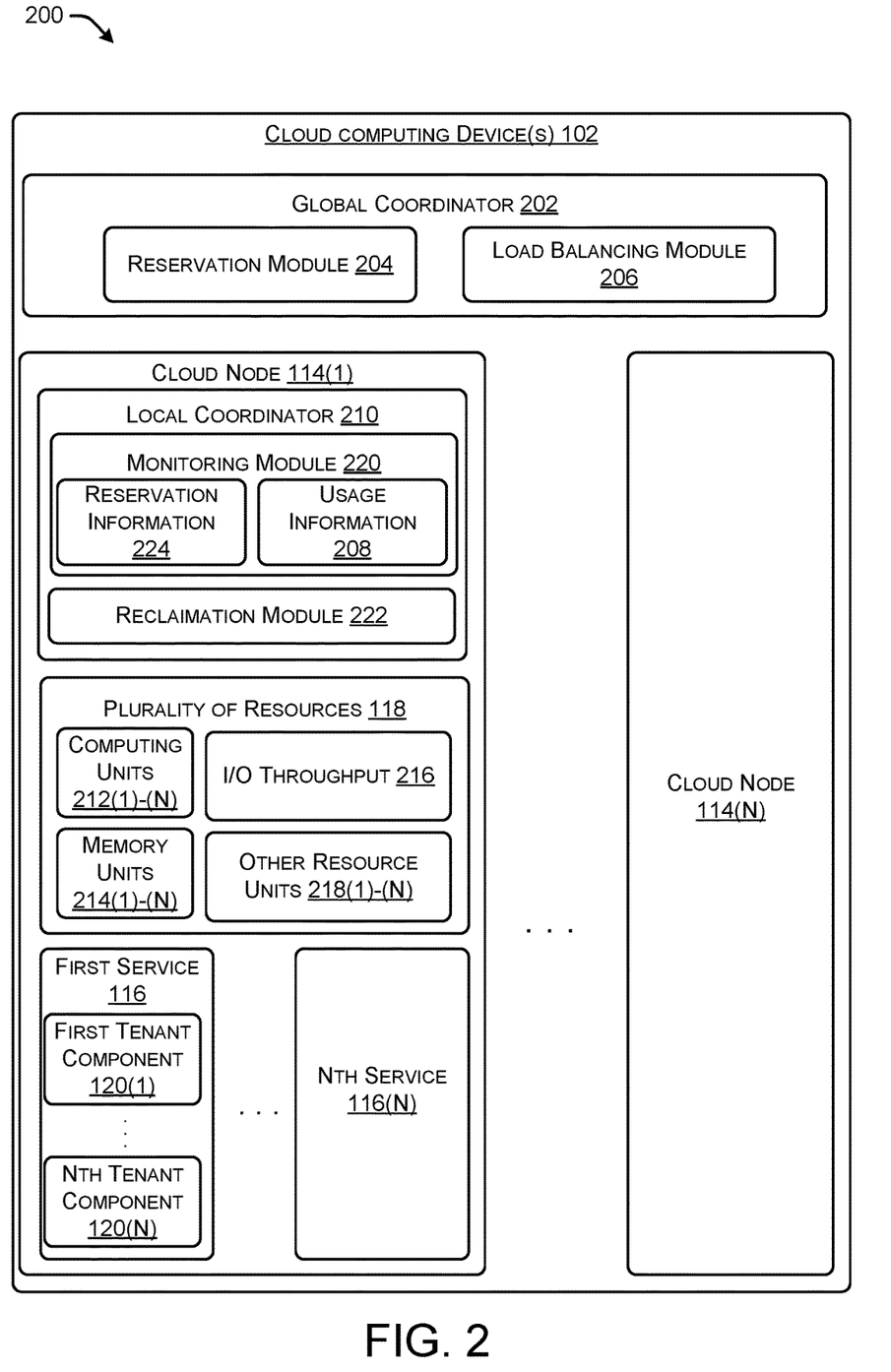
FIG. 2 is a schematic diagram showing an example cloud computing device for performing differential overbooking, in accordance with some aspects of the present disclosure.

FIG. 2 illustrates an example architecture 200 of the example cloud computing devices 102 for performing differential overbooking, in accordance with some aspects of the present disclosure. As illustrated in FIG. 2, the cloud computing system may include a global coordinator 202 configured to manage the cloud nodes 116(1)-(N) and system resources (e.g., the resources 118(1)-(N)).

Further, the global coordinator 202 may include a reservation module 204 and a load balancing module 206. In some aspects, the global coordinator may be configured to define the cloud nodes 114(1)-(N) and the corresponding resources 118(1)-(N) of each cloud node 114, and assign the services 116 to the cloud nodes 114(1)-(N). Further, the reservation module 204 may be configured to reserve the system resources of the cloud computing device 102 for the services 116. For example, the reservation module 204 may be configured to reserve a portion of the resources 118(1)-(N) of the cloud node 114(1) for a service 116(1) assigned to the cloud node 114(1). In some instances, the reservation module 204 may be configured to reserve a portion of the resources 118(1)-(N) of the cloud node 114(1) for a service 116(1) based on an overbooking value of the service 116(1), as described in detail herein. Further, in some aspects, the reservation module 204 may be configured to receive usage information 208 from the cloud nodes 114(1)-(N), determine the capacity information for each cloud node 114 based upon the usage information 208, and assign the services 116 to the cloud nodes 114 based upon the capacity information.

The load balancing module 206 may be configured to reassign a service from a first cloud node 114 to a second cloud node 114, e.g., a pre-existing node or a newly-added node. In some aspects, the load balancing module 206 may reassign a service 116 from the first cloud node 114(1) to the second cloud node 114(2) in response to a resource contention issue. In some aspects, the reservation module 204 may be configured to receive the usage information 208 from the cloud nodes 114(1)-(N), determine the capacity information for each cloud node 114 based upon the usage information 208, and reassign the services 116 amongst the cloud nodes 114 based upon the capacity information.

As illustrated in FIG. 2, each individual cloud node 114 may include a local coordinator 210 configured to manage usage of the resources 118(1)-(N). Further, in some aspects, the resources 118(1)-(N) may include a plurality of computing units 212(1)-(N), a plurality of memory units 214(1)-(N), input/output (I/O) throughput 216, and other resources units 218(1)-(N). Further, the local coordinator 210 may include a monitoring module 220 and a reclamation module 222.

In some aspects, the monitoring module 220 may be configured to monitor usage of the resources 118(1)-(N) by the services 116(1)-(N) of the cloud node 114(1), and generate the usage information 208 based upon the usage. Further, the monitoring module 220 may send the usage information 208 to the global coordinator 202. In addition, the monitoring module 220 may receive reservation information 224 from the global coordinator 202 defining the amount of resource units of the resources 118 to reserve for the services 116(1)-(N). In some aspects, the components of the global coordinator 202 and the components of the local coordinator 210 may communicate using inter-process communication (e.g., named pipes). As described in detail herein, in some aspects, the local coordinator 210 may determine that the usage of a resource 118 is above a predefined threshold and trigger a reclamation process by the reclamation module 222. If the reclamation module 222 is unsuccessful, i.e., the reclamation module 222 is unable to reclaim enough resource units to bring usage of the resource 118 below the predefined threshold, the monitoring module 220 may request a load balancing procedure be performed by the load balancing module 206 to reassign one or more of the services 116 to another cloud node 114 in order to decrease the utilization of the resource below the predefined threshold.

As described herein, during the reclamation process, the reclamation module 222 may disassociate a service 116 and at least one resource unit of a resource 118 so that the at least one resource unit may be used by another service 116 or the cloud node 114(1). In some aspects, the reclamation module 222 may reclaim a resource 118 based upon usage history, access history, a service SLO, a performance guarantee of a SLA of a service, and/or price considerations. For example, if the resource 118 is memory, the reclamation module 222 may identify memory units assigned to the service 116 that have not been accessed within a threshold amount of time (i.e., cold memory units), and reclaim the identified memory units from the service 116. As another example, if the resource is data storage, the reclamation module 222 may identify data storage units that have been deleted and not accessed within a threshold amount of time but still assigned to the service 116, and reclaim the identified data storage units from the service 116. In some aspects, reclaiming the resources 118(1)-(N) from the different services 116(1)-(N) as described in detail herein provides improved cost of goods sold for the services 116(1)-(N) by maximizing the efficiency of use with respect to the resources 118.

Example Process

The processes described in FIG. 3 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations descried herein may, but need not be implemented using the cloud computing device(s) 102. By way of example and not limitation, the process 300 are described in the context of the architecture of FIG. 1 and the cloud computing device 102 of FIGS. 1-2 and 4. For example, the operations may be performed by one or more of the global coordinator 202, the reservation module 204, the load balancing module 206, the local coordinator 210, the monitoring module 220, the reclamation module 222, and/or the services 116(1)-(N).

Figure 3:
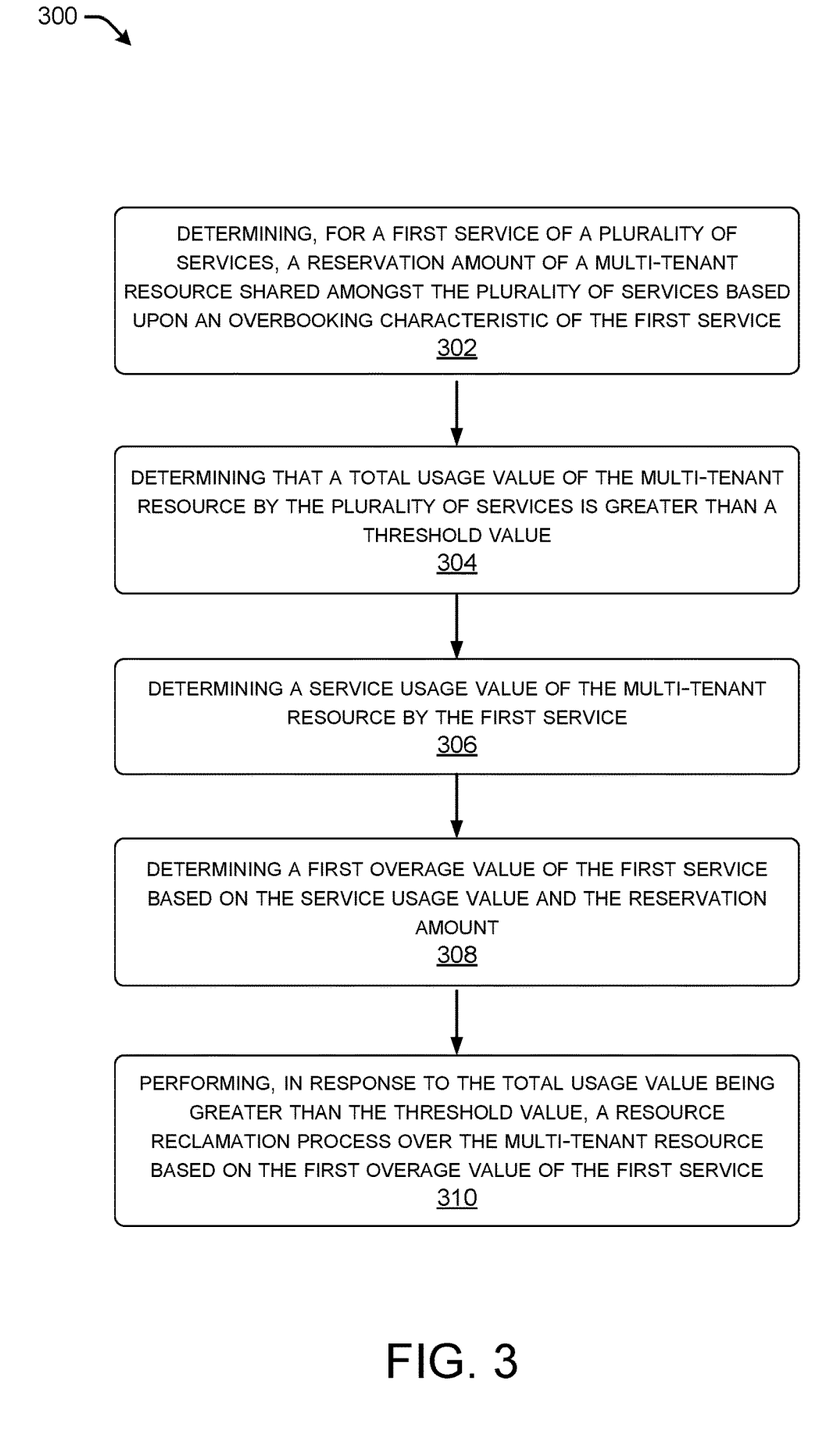
FIG. 3 is a flow diagram showing an example process for performing differential overbooking in a cloud environment, in accordance with some aspects of the present disclosure.

FIG. 3 is a flow diagram showing an example process 300 for performing differential overbooking, in accordance with some aspects of the present disclosure.

At block 302, the cloud computing device(s) may determine, for a first service of a plurality of services, a reservation amount of a multi-tenant resource shared amongst the plurality of services based upon an overbooking characteristic of the first service. For example, the global coordinator 202 may determine that the overbooking value for computing units allocated to the first service 116(1) is one and a half based on a performance requirement of an SLA for the first service 116(1) and/or the first service 116(1) being a provisioned service. Further, the global coordinator 202 may apply the overbooking value to a requested or required amount of computing units for the first service 116(1) to determine that four computing units should be reserved for the first service 116(1). In addition, the global coordinator 202 may instruct the local coordinator 210 to reserve four computing units for the first service 116(1). In some examples, the reservation instruction may be in response to an initial assignment of the first service 116(1) to the cloud node 114(1). In some other examples, the reservation instruction may be in response to increased resource usage by the first service 116(1).

Accordingly, the cloud computing device 102 or the processor 402 executing the global coordinator 202 may provide means for determining, for a first service of a plurality of services, a reservation amount of a multi-tenant resource shared amongst the plurality of services based upon an overbooking characteristic of the first service.

At block 304, the cloud computing device(s) may determine that a total usage value of the multi-tenant resource by the plurality of services is greater than a threshold value. For example, the monitoring module 220 may determine that the usage of the computing units 212(1)-(N) by the services 116(1)-(N) is above a threshold (e.g., a predefined threshold value).

Accordingly, the cloud computing device 102 or the processor 402 executing the monitoring module 220 may provide means for determining that a total usage value of the multi-tenant resource by the plurality of services is greater than a threshold value.

At block 306, the cloud computing device(s) may determine a service usage value of the multi-tenant resource by the first service. For example, the monitoring module 220 may determine that the first service 116(1) is currently using six computing units (e.g., the six computing units 210(1)-(6)) to service the tenant components 120(1)-(N).

Accordingly, the cloud computing device 102, or the processor 402 executing the monitoring module 220 may provide means for determining a service usage value of the multi-tenant resource by the first service.

At block 308, the cloud computing device(s) may determine a first overage value of the first service based on the service usage value and the reservation amount. For example, the monitoring module 220 may determine the overage value of the first service 116(1) based on comparing the amount of computing units 212 currently used by the first service 116(1) to the amount of computing units 212 reserved for the first service 116(1). In addition, the monitoring module 220 may determine the overage value for each of the services 116(1).

Accordingly, the cloud computing device 102, or the processor 402 executing the monitoring module 220 may provide means for determining a first overage value of the first service based on the service usage value and the reservation amount.

At block 310, the cloud computing device(s) may perform, in response to the total usage value being greater than the threshold value, a resource reclamation process over the multi-tenant resource based on the first overage value of the first service. For example, the monitoring module 220 may determine that overage value of the first service 116(1) is greater than a threshold value (e.g., a highest overage value of the overage values of the other services 116(1)-(N) of the cloud node 114(1), a predefined threshold, etc.), and the reclamation module 222 may perform the reclamation process over the computing units 218(1)-(6) associated with the first service 116(1). In some other examples, the monitoring module 220 may determine a relationship between the first overage value and one or more other overage values and reclaim the computing units 212 based upon the relationship. For instance, if the ratio between the first overage value and second overage value is two to one, the monitoring module 220 may cause the reclamation module 222 to reclaim twice as many reclaimable computing units from the first service 116(1) as the second service 116(2).

In some aspects, the reclamation module 222 may be unable to sufficiently reduce the usage of the resource below a predefined threshold. As a result, the reclamation module 222 may reclaim computing units from another service 116 and/or request that the load balancing module 206 reassign a service 116 to one of the other cloud nodes 114(2)-(N).

Accordingly, the cloud computing device 102, or the processor 402 executing the reclamation module 222 may provide means for performing, in response to the total usage value being greater than the threshold value, a resource reclamation process over the multi-tenant resource based on the first overage value of the first service.

While the operations are described as being implemented by one or more computing devices, in other examples various systems of computing devices may be employed. For instance, a system of multiple devices may be used to perform any of the operations noted above in conjunction with each other. For example, a car with an internal computing device along with a mobile computing device may be employed in conjunction to perform these operations.

Illustrative Computing Device

Figure 4:
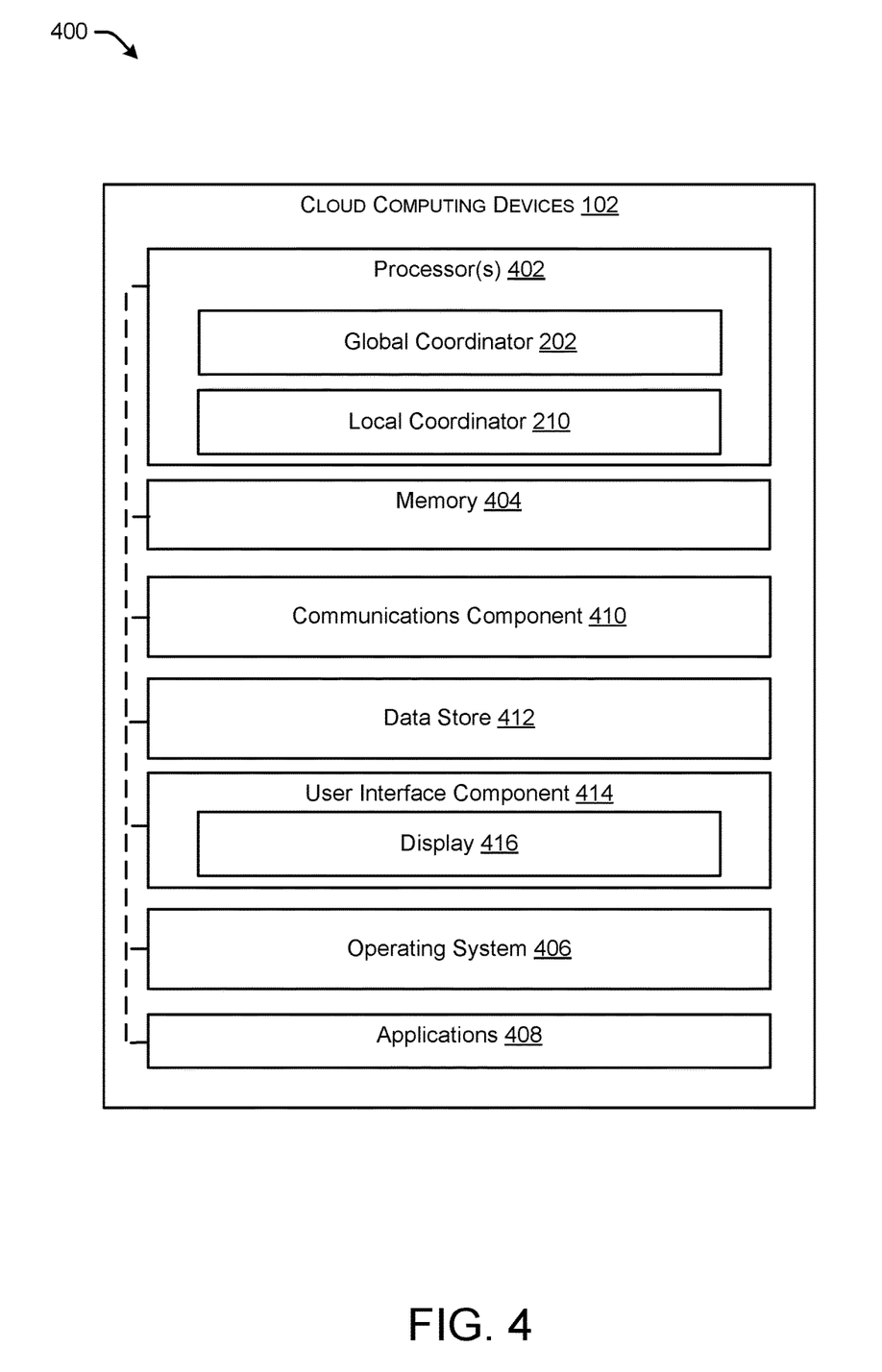
FIG. 4 is a schematic block diagram of example components of the cloud computing device of FIG. 1, according to aspects of the present disclosure in accordance with some aspects of the present disclosure.

Referring now to FIG. 4, an example 400 of the cloud computing device 102 in accordance with an implementation includes additional component details as compared to FIG. 2. In one example, the cloud computing device 102 includes the processor 402 for carrying out processing functions associated with one or more of components and functions described herein. The processor 402 can include a single or multiple set of processors or multi-core processors. Moreover, the processor 402 may be implemented as an integrated processing system and/or a distributed processing system. In an example, the processor 402 includes, but is not limited to, any processor specially programmed as described herein, including a controller, microcontroller, a computer processing unit (CPU), a graphics processing unit (GPU), an application specific integrated circuit (ASIC), a field programmable gate array (FPGA), a system on chip (SoC), or other programmable logic or state machine. Further, the processor 402 may include other processing components such as one or more arithmetic logic units (ALUs), registers, or control units.

In an example, the cloud computing device 102 also includes the memory 404 for storing instructions executable by the processor 402 for carrying out the functions described herein. The memory 404 may be configured for storing data and/or computer-executable instructions defining and/or associated with the operating system 406, global coordinator 202, local coordinator 210, one or more applications 408, and the processor 402 may execute the operating system 406, global coordinator 202, local coordinator 210, and/or the one or more applications 408. An example of memory 404 may include, but is not limited to, a type of memory usable by a computer, such as random access memory (RAM), read only memory (ROM), tapes, magnetic discs, optical discs, volatile memory, non-volatile memory, and any combination thereof. In an example, the memory 404 may store local versions of applications being executed by processor 402.

The example cloud computing device 102 also includes a communications component 410 that provides for establishing and maintaining communications with one or more parties utilizing hardware, software, and services as described herein. The communications component 410 may carry communications between components on the cloud computing device 102, as well as between the cloud computing device 102 and external devices, such as devices located across a communications network and/or devices serially or locally connected to the cloud computing device 102. For example, the communications component 410 may include one or more buses, and may further include transmit chain components and receive chain components associated with a transmitter and receiver, respectively, operable for interfacing with external devices. In an implementation, for example, the communications component 410 may include a connection to communicatively couple the tenant devices 104(1)-N or the client devices 108(1)-(N) to the processor 402.

The example cloud computing device 102 also includes a data store 412, which may be any suitable combination of hardware and/or software, that provides for mass storage of information, databases, and programs employed in connection with implementations described herein. For example, the data store 412 may be a data repository for the operating system 406 and/or the applications 408.

The example cloud computing device 102 also includes a user interface component 414 operable to receive inputs from a user of the cloud computing device 102 and further operable to generate outputs for presentation to the user. The user interface component 414 may include one or more input devices, including but not limited to a keyboard, a number pad, a mouse, a touch-sensitive display (e.g., display 416), a digitizer, a navigation key, a function key, a microphone, a voice recognition component, any other mechanism capable of receiving an input from a user, or any combination thereof. Further, the user interface component 414 may include one or more output devices, including but not limited to a display (e.g., display 416), a speaker, a haptic feedback mechanism, a printer, any other mechanism capable of presenting an output to a user, or any combination thereof In an implementation, the user interface component 414 may transmit and/or receive messages corresponding to the operation of the operating system 406 and/or the applications 408. In addition, the processor 402 executes the operating system 406 and/or the applications 408, and the memory 404 or the data store 412 may store them.

While the global coordinator 202 and the local coordinator 210 are illustrated as part of the processor 402, implementations of the present disclosure are not limited to this example, in other examples, the global coordinator 202, the local coordinator 210, and/or one or more of the subcomponents of the global coordinator 202 and/or the local coordinator 210 may be implemented in one or more components/subcomponents of the cloud computing device 102. For example, one or more of the subcomponents of the global coordinator 202 and/or the local coordinator 210 may be implemented in one or more of the processor 402, the applications 408, the operating system 406, and/or the user interface component 414 such that the subcomponents of the global coordinator 202 and/or the local coordinator 210 are spread out between the components/subcomponents of the cloud computing device 102.

EXAMPLE CLAUSES

A. A method comprising: determining, for a first service of a plurality of services, a reservation amount of a multi-tenant resource shared amongst the plurality of services based upon an overbooking characteristic of the first service; determining that a total usage value of the multi-tenant resource by the plurality of services is greater than a threshold value; determining a service usage value of the multi-tenant resource by the first service; determining a first overage value of the first service based on the service usage value and the reservation amount; and performing, in response to the total usage value being greater than the threshold value, a resource reclamation process over the multi-tenant resource based on the first overage value of the first service.

B. The method as paragraph A recites, further comprising determining a second overage value of a second service of the plurality of services, and wherein performing the resource reclamation process comprises: determining that the first overage value is greater than the second overage value; and reclaiming a portion of the multi-tenant resource previously-assigned to the first service.

C. The method as paragraph A recite, further comprising determining a second overage value of a second service of the plurality of services, and wherein performing the resource reclamation process comprises: determining a relationship between the first overage value and the second overage value; and reclaiming a first portion and a second portion of the multi-tenant resource based on the relationship, the first portion of the multi-tenant resource previously-assigned to the first service and the second portion of the multi-tenant resource previously-assigned to the second service.

D. The method as any of paragraphs A-C recite, wherein performing the resource reclamation process comprises: identifying, based on usage history, a portion of the multi-tenant resource used by the first service; and reclaiming the portion of the multi-tenant resource used by the first service.

E. The method as any of paragraphs A-D recite, wherein the multi-tenant resource is storage, and performing the resource reclamation process comprises: identifying a portion of the storage that has been indicated as deleted and not been accessed in a period of time greater than a threshold amount; and disassociating the portion of the storage from the first service.

F. The method as any of paragraphs A-D recite, wherein the multi-tenant resource is memory, and performing the resource reclamation process comprises: identifying a portion of the memory that has not been accessed in a period of time greater than a threshold amount; and disassociating the portion of the memory from the first service.

G. The method as any of paragraphs A-F recite, wherein the total usage value of the multi-tenant resource is a first total usage value of the multi-tenant resource, and further comprising: determining that a second total usage value of the multi-tenant resource by the plurality of services is greater than the threshold value; determining, in response to the second total usage value being greater than the threshold value, an overage value for each of the plurality of services; and requesting, from a global coordinator service, a load balancing procedure based upon the overage value for each of the plurality of services.

H. The method as any of paragraphs A-G recite, wherein the multi-tenant resource includes at least one of storage, computing units, bandwidth, memory, field programmable gate arrays (FPGAs), graphics processing units (GPUs), input-output (I/O) throughput, or data/instruction cache.

I. The method as any of paragraphs A-H recite, wherein the first service includes a database-as-a-service (DaaS) configured to provide individual database instances to tenants of a multi-tenancy.

J. The method as any of paragraphs A-I recite, wherein the first service is of a different service type than a second service of the plurality of services, the second service having a different overbooking characteristic than the first service.

K. The method as any of paragraphs A-J recite, wherein a service type of the first service is an infrastructure as a service, platform as a service, software as a service, database as a service, security as a service, big data as a service, monitoring as a service, logging as a service, internet of things as a service, identity as a service, analytics as a service, function as a service, or coding as a service.

L. A device comprising: a memory; and at least one processor coupled to the memory and configured to: determine, for a first service of a plurality of services, a reservation amount of a multi-tenant resource shared amongst the plurality of services based upon an overbooking characteristic of the first service; determine that a total usage value of the multi-tenant resource by the plurality of services is greater than a threshold value; determine a service usage value of the multi-tenant resource by the first service; determine a first overage value of the first service based on the service usage value and the reservation amount; and perform, in response to the total usage value being greater than the threshold value, a resource reclamation process over the multi-tenant resource based on the first overage value of the first service.

M. The device as paragraph L recites, wherein the multi-tenant resource includes at least one of storage, computing units, bandwidth, the memory, field programmable gate arrays (FPGAs), graphics processing units (GPUs), input-output throughput, or data/instruction cache.

N. The device as any of paragraph L or M recites, wherein the first service is of a different service type than a second service of the plurality of services, the second service having a different overbooking characteristic.

O. A non-transitory computer-readable device having instructions thereon that, when executed by at least one computing device, causes the at least one computing device to perform operations comprising determining that a total usage value of the multi-tenant resource by the plurality of services is greater than a threshold value; determining a service usage value of the multi-tenant resource by the first service; determining a first overage value of the first service based on the service usage value and the reservation amount; and performing, in response to the total usage value being greater than the threshold value, a resource reclamation process over the multi-tenant resource based on the first overage value of the first service.

P. The device as paragraph O recites, wherein performing the resource reclamation process comprises: identifying, based on usage history, a portion of the multi-tenant resource used by the first service; and reclaiming the portion of the multi-tenant resource used by the first service.

Q. A computer-implemented method as paragraph O or P recite, wherein the multi-tenant resource includes at least one of storage, computing units, bandwidth, memory, field programmable gate arrays (FPGAs), graphics processing units (GPUs), input-output throughput, or data/instruction cache.

R. One or more computer-readable media encoded with instructions that, when executed by one or more processors, configure a computing device to perform a computer-implemented method as any of paragraphs A-K recite.

S. A device comprising one or more processors and one or more computer-readable media encoded with instructions that, when executed by the one or more processors, configure a computer to perform a computer-implemented method as any of paragraphs A-K recite. Conclusion In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

What is claimed is:

1. A method comprising:
   determining, for a first service of a plurality of services, a reservation amount of a multi-tenant resource shared amongst the plurality of services based upon an overbooking value of the first service, the overbooking value representing a ratio for overbooking a request by the first service for the multi-tenant resource;
   determining that a total usage value of the multi-tenant resource by the plurality of services is greater than a threshold value;
   determining a service usage value of the multi-tenant resource by the first service;
   determining a first overage value of the first service based on the service usage value and the reservation amount; and
   performing, in response to the total usage value being greater than the threshold value, a resource reclamation process over the multi-tenant resource based on the first overage value of the first service.

2. The method of claim 1, further comprising determining a second overage value of a second service of the plurality of services, and wherein performing the resource reclamation process comprises:
   determining that the first overage value is greater than the second overage value; and
   reclaiming a portion of the multi-tenant resource previously-assigned to the first service.

3. The method of claim 1, further comprising determining a second overage value of a second service of the plurality of services, and wherein performing the resource reclamation process comprises:
   determining a relationship between the first overage value and the second overage value; and
   reclaiming a first portion and a second portion of the multi-tenant resource based on the relationship, the first portion of the multi-tenant resource previously-assigned to the first service and the second portion of the multi-tenant resource previously-assigned to the second service.

4. The method of claim 1, wherein performing the resource reclamation process comprises:
   identifying, based on usage history, a portion of the multi-tenant resource used by the first service; and
   reclaiming the portion of the multi-tenant resource used by the first service.

5. The method of claim 1, wherein the multi-tenant resource is storage, and performing the resource reclamation process comprises:
   identifying a portion of the storage that has been indicated as deleted and not been accessed in a period of time greater than a threshold amount; and
   disassociating the portion of the storage from the first service.

6. The method of claim 1, wherein the multi-tenant resource is memory, and performing the resource reclamation process comprises:
   identifying a portion of the memory that has not been accessed in a period of time greater than a threshold amount; and
   disassociating the portion of the memory from the first service.

7. The method of claim 1, wherein the total usage value of the multi-tenant resource is a first total usage value of the multi-tenant resource, and further comprising:
   determining that a second total usage value of the multi-tenant resource by the plurality of services is greater than the threshold value;
   determining, in response to the second total usage value being greater than the threshold value, an overage value for each of the plurality of services; and
   requesting, from a global coordinator service, a load balancing procedure based upon the overage value for each of the plurality of services.

8. The method of claim 1, wherein the multi-tenant resource includes at least one of storage, computing units, bandwidth, memory, field programmable gate arrays (FPGAs), graphics processing units (GPUs), input-output (I/O) throughput, or data/instruction cache.

9. The method of claim 1, wherein the first service includes a database-as-a- service (DaaS) configured to provide individual database instances to tenants of a multi-tenancy.

10. The method of claim 1, wherein the first service is of a different service type than a second service of the plurality of services, the second service having a different overbooking characteristic than the first service.

11. The method of claim 10, wherein a service type of the first service is an infrastructure as a service, platform as a service, software as a service, database as a service, security as a service, big data as a service, monitoring as a service, logging as a service, internet of things as a service, identity as a service, analytics as a service, function as a service, or coding as a service.

12. A device comprising:
    a memory; and
    at least one processor coupled to the memory and configured to:
       determine, for a first service of a plurality of services, a reservation amount of a multi-tenant resource shared amongst the plurality of services based upon an overbooking value of the first service, the overbooking value representing a ratio for overbooking a request by the first service for the multi-tenant resource;
       determine that a total usage value of the multi-tenant resource by the plurality of services is greater than a threshold value;
       determine a service usage value of the multi-tenant resource by the first service;
       determine a first overage value of the first service based on the service usage value and the reservation amount; and perform, in response to the total usage value being greater than the threshold value, a resource reclamation process over the multi-tenant resource based on the first overage value of the first service.

13. The device of claim 12, wherein to perform the resource reclamation process, the at least one processor is configured to:
   determine that the first overage value is greater than a second overage value associated with a second service of the plurality of services; and
   reclaim a portion of the multi-tenant resource previously-assigned to the first service.

14. The device of claim 12, wherein to perform the resource reclamation process, the at least one processor is configured to:
   identify, based on usage history, a portion of the multi-tenant resource used by the first service; and
   reclaim the portion of the multi-tenant resource used by the first service.

15. The device of claim 12, wherein the multi-tenant resource includes the memory, and to perform the resource reclamation process, the at least one processor is configured to:
   identifying a portion of the memory that has not been accessed in a period of time greater than a threshold amount; and
   disassociating the portion of the memory from the first service.

16. The device of claim 12, wherein the multi-tenant resource includes at least one of storage, computing units, bandwidth, the memory, field programmable gate arrays (FPGAs), graphics processing units (GPUs), input-output throughput, or data/instruction cache.

17. The device of claim 12, wherein the first service is of a different service type than a second service of the plurality of services, the second service having a different overbooking characteristic.

18. A non-transitory computer-readable device having instructions thereon that, when executed by at least one computing device, causes the at least one computing device to perform operations comprising:
   determining, for a first service of a plurality of services, a reservation amount of a multi-tenant resource shared amongst the plurality of services based upon an overbooking value of the first service, the overbooking value representing a ratio for overbooking a request by the first service for the multi-tenant resource;
   determining that a total usage value of the multi-tenant resource by the plurality of services is greater than a threshold value;
   determining a service usage value of the multi-tenant resource by the first service;
   determining a first overage value of the first service based on the service usage value and the reservation amount; and
   performing, in response to the total usage value being greater than the threshold value, a resource reclamation process over the multi-tenant resource based on the first overage value of the first service.

19. The non-transitory computer-readable device of claim 18, wherein performing the resource reclamation process comprises:
   identifying, based on usage history, a portion of the multi-tenant resource used by the first service; and
   reclaiming the portion of the multi-tenant resource used by the first service.

20. The non-transitory computer-readable device of claim 18, wherein the multi-tenant resource includes at least one of storage, computing units, bandwidth, memory, field programmable gate arrays (FPGAs), graphics processing units (GPUs), input-output throughput, or data/instruction cache.

* * * * *